US012589473B2

(12) United States Patent
Hsieh

(10) Patent No.: US 12,589,473 B2
(45) Date of Patent: Mar. 31, 2026

(54) SOCKET

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 393 days.

(21) Appl. No.: 18/195,993

(22) Filed: May 11, 2023

(65) Prior Publication Data

US 2023/0364753 A1 Nov. 16, 2023

Related U.S. Application Data

(60) Provisional application No. 63/364,563, filed on May 12, 2022.

(51) Int. Cl.
*B25B 23/10* (2006.01)
*B25B 13/06* (2006.01)

(52) U.S. Cl.
CPC ............ *B25B 23/108* (2013.01); *B25B 13/06* (2013.01)

(58) Field of Classification Search
CPC ....... B25B 13/06; B25B 13/54; B25B 23/108; B25B 23/10; B25B 23/08
USPC .................................................... 81/448, 449
See application file for complete search history.

(56) References Cited

U.S. PATENT DOCUMENTS 2,805,594 A * 9/1957 Fogel .................... B25B 23/108 81/125
2,851,295 A * 9/1958 Chaffee ............... B25B 23/0035 81/177.85
4,823,652 A * 4/1989 Morrissey ............... B25B 13/08 81/125
5,323,672 A * 6/1994 Skiba ...................... B25B 13/04 81/177.85
5,848,561 A * 12/1998 Hsieh .................... B25B 13/462 81/125
6,637,755 B2 * 10/2003 Chen ................... B25B 23/0057 279/22
7,437,975 B1 * 10/2008 De Anfrasio ........... B25B 13/06 81/125
7,752,946 B2 * 7/2010 Wang .................... B25B 23/108 81/125
7,757,588 B2 * 7/2010 Chen ................... B25B 23/0035 81/177.85

(Continued)

*Primary Examiner* — David B. Thomas
(74) *Attorney, Agent, or Firm* — CKC & Partners Co., LLC

(57) ABSTRACT

A socket includes a body, a through hole, an accommodating base and an abutting element. The body includes an outer wall and an operating inner surface. The operating inner surface surrounds an operating space, and the operating space is configured for a tool to insert therein. The through hole penetrates the outer wall and the operating inner surface radially, and the through hole is communicated with the operating space. The accommodating base is accommodated in the through hole and includes a bottom portion and a surrounding wall. The bottom portion is located at an outer end of the through hole and covers the through hole. The surrounding wall is connected to the bottom portion and located in the through hole. The surrounding wall and the bottom portion surround an accommodating space. The abutting element is disposed in the accommodating space.

13 Claims, 4 Drawing Sheets

(56) References Cited

U.S. PATENT DOCUMENTS

| | | | | |
|---|---|---|---|---|
| 8,366,120 | B2 * | 2/2013 | Hu | B25B 23/12<br>279/66 |
| 8,366,121 | B2 * | 2/2013 | Hu | B25B 23/0035<br>279/66 |
| 8,984,992 | B2 * | 3/2015 | Newkirk | B25B 13/06<br>81/125 |
| 11,015,638 | B2 * | 5/2021 | Phan | F16B 41/002 |
| 11,780,064 | B2 * | 10/2023 | Hsieh | B25B 23/0035<br>81/438 |
| 2008/0179840 | A1 * | 7/2008 | Huang | B23B 31/1072<br>279/74 |
| 2013/0139654 | A1 * | 6/2013 | Chen | B25B 23/108<br>81/125 |
| 2021/0170556 | A1 * | 6/2021 | Lai | B25B 23/108 |

* cited by examiner

SOCKET

RELATED APPLICATIONS

This application claims priority to U.S. Provisional Application Ser. No. 63/364,563, filed May 12, 2022 which is herein incorporated by reference.

BACKGROUND

Technical Field

The present disclosure relates to a socket. More particularly, the present disclosure relates to a socket which can abut against a tool.

Description of Related Art

With the advance of technologies, during operating a tool such as a screw tool, a user often holds the tool by a socket to improve the convenience of operating. When the socket is used to hold the tool, the tool is often detached from the socket due to an excessive force applied by the user, which causes a waste of the time. The practitioners develop various accessories for using with the socket for improving the stability of the socket as holding the tool. For example, an abutting element is disposed at an inner side of the socket and configured for abutting against and holding the tool. However, when the abutting element is disposed in the conventional socket for improving the fixing stability of the abutting element at the socket, it is necessary to drill a through hole with a complicated shape at the socket, so the difficulty of processing and the manufacturing cost are further increased.

Accordingly, a socket under the condition that the stability of holding the tool can be improved without increasing the manufacturing cost is still the goal the practitioners pursue.

SUMMARY

According to one aspect of the present disclosure, a socket includes a body, a through hole, an accommodating base and an abutting element. The body includes an outer wall and an operating inner surface. The operating inner surface surrounds an operating space, and the operating space is configured for a tool to insert therein. The through hole penetrates the outer wall and the operating inner surface radially, and the through hole is communicated with the operating space. The accommodating base is accommodated in the through hole and includes a bottom portion and a surrounding wall. The bottom portion is located at an outer end of the through hole and covers the through hole. The surrounding wall is connected to the bottom portion and located in the through hole. The surrounding wall and the bottom portion surround an accommodating space. The abutting element is disposed in the accommodating space. The abutting element is exposed from the through hole partially and protrudes into the operating space, and the abutting element is configured for abutting against the tool.

BRIEF DESCRIPTION OF THE DRAWINGS

The present disclosure can be more fully understood by reading the following detailed description of the embodiment, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other elements, or it can be indirectly disposed on, connected or coupled to the other elements, that is, intervening elements may be present. In contrast, when an element is referred to as being "directly disposed on", "directly connected to" or "directly coupled to" another element, there is no intervening element present.

In addition, the terms first, second, third, etc. are used herein to describe various elements or components, these elements or components should not be limited by these terms. Consequently, a first element or component discussed below could be termed a second element or component.

Figure 1:
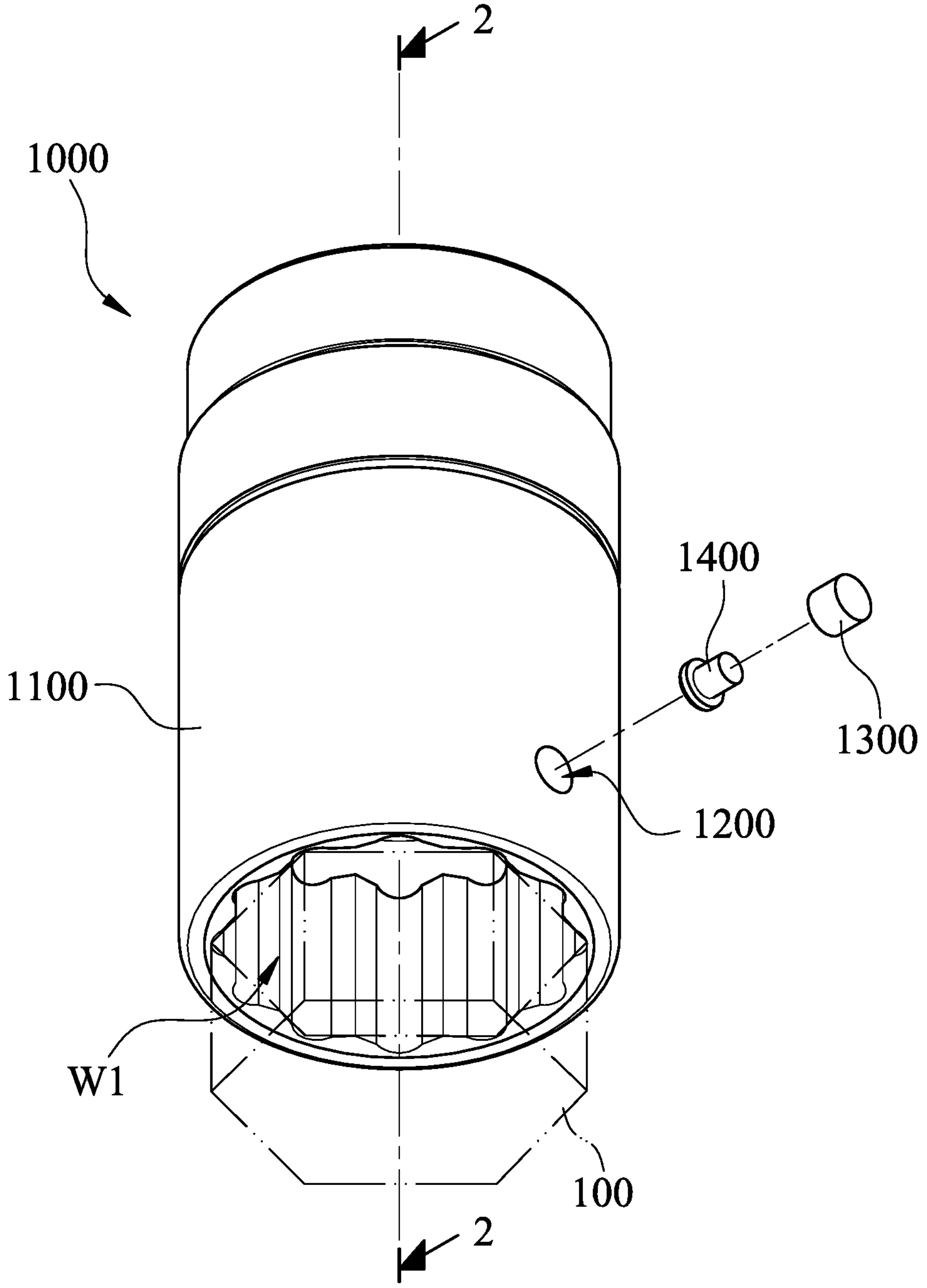
FIG. 1 shows an exploded view of a socket according to the first embodiment of the present disclosure and a tool.
Figure 2:
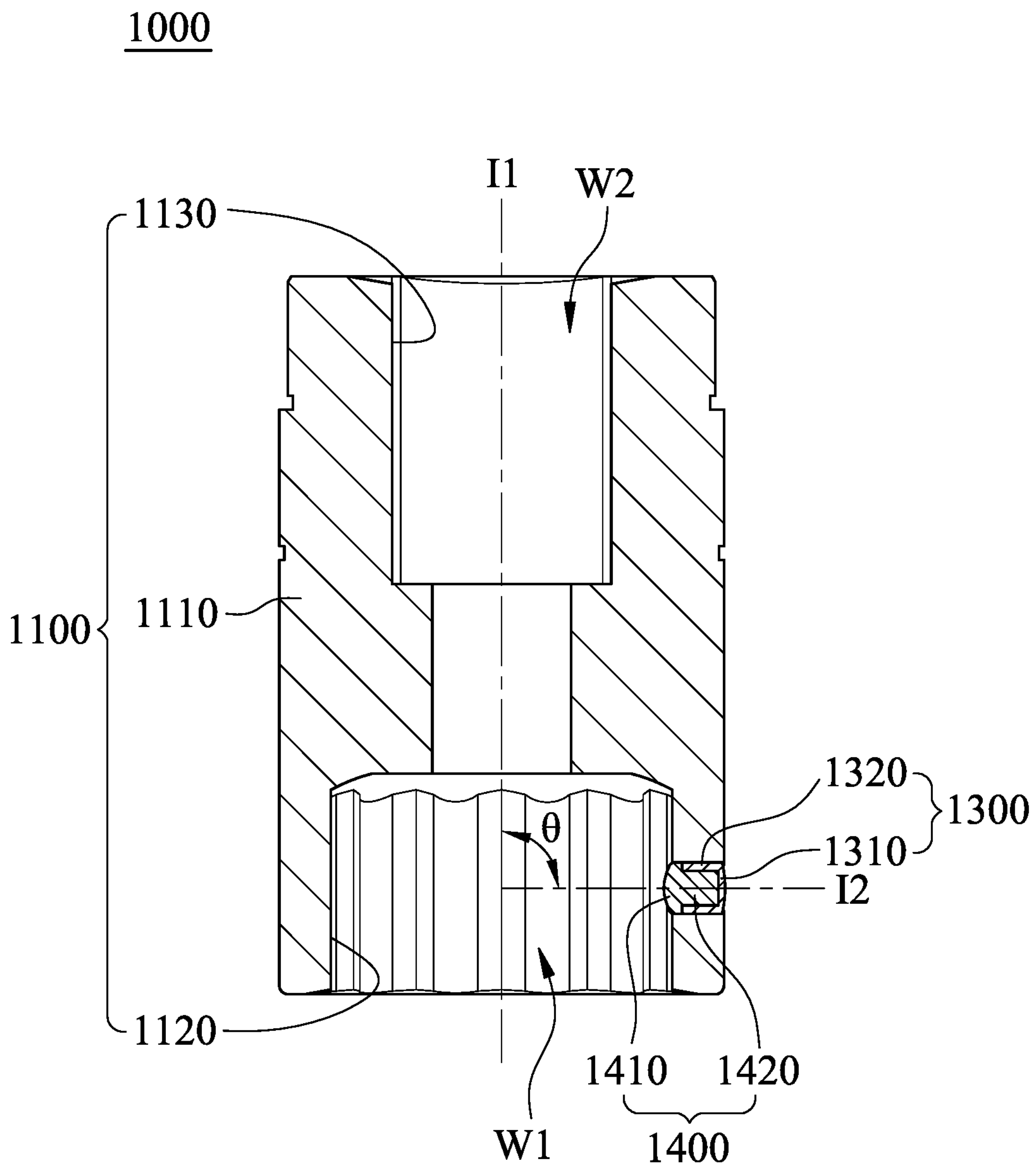
FIG. 2 shows a cross-sectional view of the socket along a cutting line 2-2 according to the first embodiment in FIG. 1.

FIG. 1 shows an exploded view of a socket 1000 according to the first embodiment of the present disclosure and a tool 100. FIG. 2 shows a cross-sectional view of the socket 1000 along a cutting line 2-2 according to the first embodiment in FIG. 1. As shown in FIGS. 1 and 2, the socket 1000 includes a body 1100, a through hole 1200, an accommodating base 1300 and an abutting element 1400. The body 1100 includes an outer wall 1110, an operating inner surface 1120 and a driving inner surface 1130. The operating inner surface 1120 surrounds an operating space W1, and the operating space W1 is configured for the tool 100 to insert therein. The driving inner surface 1130 surrounds a driving space W2, and the driving space W2 is configured for a driving tool to insert therein. In other words, two ends of the body 1100 can form the operating space W1 and the driving space W2, respectively. The through hole 1200 penetrates the outer wall 1110 and the operating inner surface 1120 radially, and the through hole 1200 is communicated with the operating space W1. The accommodating base 1300 is accommodated in the through hole 1200 and includes a bottom portion 1310 and a surrounding wall 1320. The bottom portion 1310 is located at an outer end of the through hole 1200 and covers the through hole 1200, the surrounding wall 1320 is connected to the bottom portion 1310 and located in the through hole 1200, and the surrounding wall 1320 and the bottom portion 1310 surround an accommodating space. The abutting element 1400 is disposed in the accommodating space. The abutting element 1400 is partially exposed from the through hole 1200 and protrudes into the operating space W1, and the abutting element 1400 is configured for abutting against the tool 100.

With the combination of the accommodating base 1300 and the abutting element 1400, the accommodating base 1300 can be disposed in the through hole 1200 by interference, and the abutting element 1400 is disposed in the accommodating base 1300. During processing of the socket 1000, the abutting element 1400 can be fixed in the through hole 1200 without using an adhesive, and there is no additional process for disposing the abutting element 1400 in the through hole 1200 at the body 1100 to avoid the fact that the design complexity of the through hole and the abutting element is increased for increasing the engaging stability of the conventional socket. Therefore, the difficulty of processing and manufacturing cost can be reduced.

A user can insert a driving tool such as a pneumatic tool or a wrench into the driving space W2 to drive the socket 1000 with an engaging tooth structure of the operating inner surface 1120 to hold the tool 100 for operating, and the tool 100 can be a nut for example. The strength of the socket 1000 holding the tool 100 can be increased by protruding the abutting element 1400 into the operating space W1 to improve the holding stability of the socket 1000 and prevent the tool 100 from detaching due to accidental shaking. The details of the structure of the socket 1000 are described in the following.

As shown in FIG. 2, an angle θ is included between an axial direction 12 of the through hole 1200 and a central axis 11 of the body 1100, the surrounding wall 1320 extends from the bottom portion 1310 along the axial direction 12, and an outside diameter of the surrounding wall 1320 equals to a diameter of the through hole 1200. The angle θ between the axial direction 12 of the through hole 1200 and the central axis 11 of the body 1100 is 90 degrees. In other embodiments, the angle between the axial direction and the central axis can be smaller than 90 degrees to allow the abutting element to be inserted into and slanted towards the accommodating base to adjust the position of the abutting element for abutting against the tool. Therefore, the surface area of the abutting element abutting against the tool can be increased.

A shape of the through hole 1200 can be cylinder, a diameter of the through hole 1200 can be 3 mm, and a shape of the accommodating base 1300 corresponding to the shape of the through hole 1200 is a cylindrical groove. In other embodiments, the shape of the through hole can be a rectangular prism, a polygon prism, or an irregular prism including bumpy surfaces, the shape of the accommodating base corresponds to the shape of the through hole, but the present disclosure is not limited thereto. Therefore, the stability of the abutting element 1400 abutting against the tool 100 can be improved.

The abutting element 1400 can include an abutting portion 1410 and a supporting portion 1420, the abutting portion 1410 is integrally connected to the supporting portion 1420, the supporting portion 1420 is accommodated in the accommodating space, and the abutting portion 1410 covers the surrounding wall 1320. A thickness of the abutting portion 1410 is tapered outwardly from a center of the abutting portion 1410, so that a shape of the abutting portion 1410 can be substantially a mushroom cap. The supporting portion 1420 can provide the stress to support the abutting portion 1410 to improve the stability of the abutting element 1400 abutting against the tool 100. An integral design of the butting portion 1410 and the supporting portion 1420 can simplify the processing of the abutting element 1400 and reduce the manufacturing cost. The abutting element 1400 can be made of an elastic material such as a rubber or an elastic plastic material, but the present disclosure is not limited thereto. When the abutting element 1400 made of the elastic material abuts against and hold the tool 100, the abutting element 1400 is deformed to reduce the abrasion between the abutting element 1400 and the tool 100 and provides the enough holding strength.

The surrounding wall 1320 can be integrally connected to the bottom portion 1310. The accommodating base 1300 can be made of a metal material. Specifically, the accommodating base 1300 is made of a copper material. Therefore, via the accommodating base 1300 made of the copper material, the manufacturing cost and the shaping difficulty of the accommodating base 1300 can be reduced. In other embodiments, the accommodating base can be made of other metal materials, but the present disclosure is not limited thereto.

In other embodiments, a number of the through holes, a number of the accommodating bases and a number of the abutting elements can be plural. The through holes penetrate the outer wall and the operating inner surface radially, and the through holes are arranged and spaced away from each other, the number of the accommodating bases and the number of the abutting elements both correspond to the number of the through holes to further improve the stability of the socket holding the tool, but the present disclosure is not limited to the aforementioned numbers.

Figure 3:
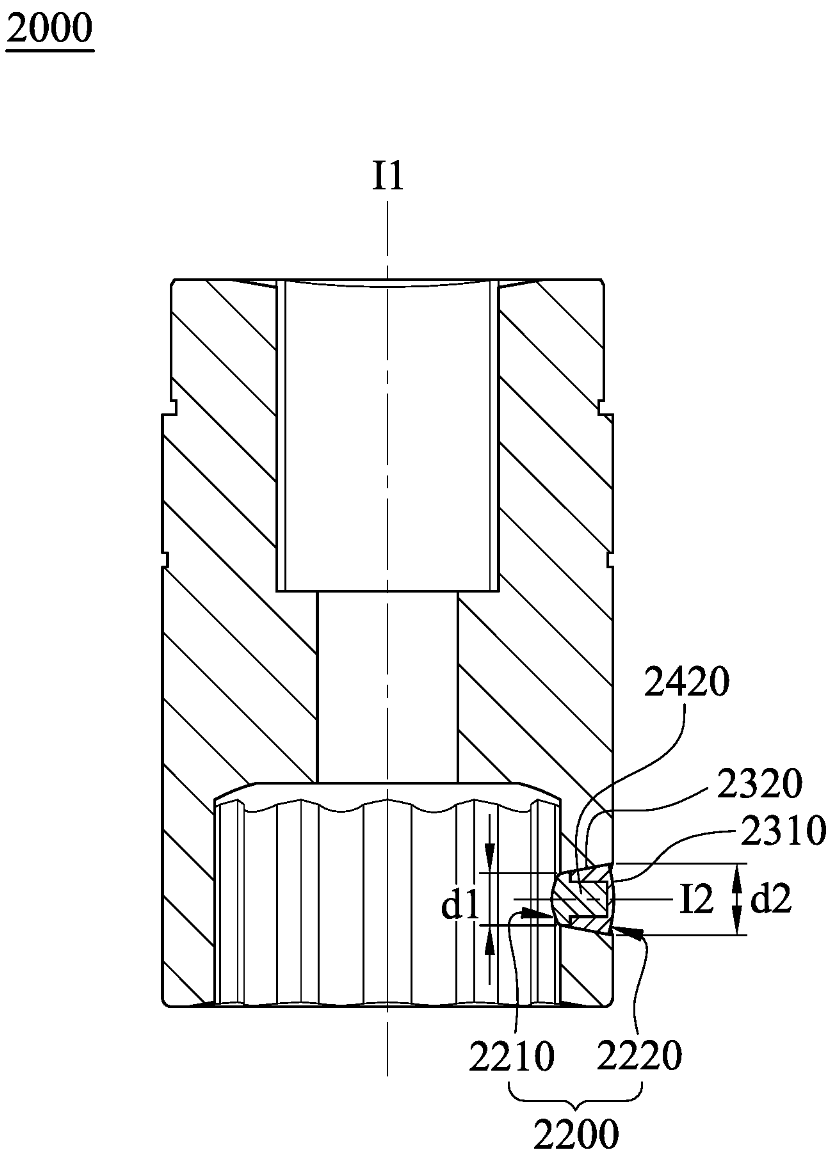
FIG. 3 shows a cross-sectional view of a socket according to the second embodiment of the present disclosure.

FIG. 3 shows a cross-sectional view of a socket 2000 according to the second embodiment of the present disclosure. In the second embodiment, a structure of the socket 2000 is similar with the structure of the socket 1000 of the first embodiment, so it will not be described herein again. It is worthy to be mentioned that a through hole 2200 penetrates an operating inner surface to form a first opening 2210, the through hole 2200 penetrates an outer wall to form a second opening 2220, and a diameter d1 of the first opening 2210 is smaller than a diameter d2 of the second opening 2220. In other words, the through hole 2200 is tapered off along a direction from the outer wall to the operating inner surface. As shown in FIG. 3, a shape of the through hole 2200 is a trapezoid on a project plane of the cross section. Moreover, an outside diameter of a surrounding wall 2320 is tapered off along the direction from the outer wall to the operating inner surface to form a cone shape, the outside diameter of the surrounding wall 2320 varies with an inside diameter of the through hole 2200 to allow the surrounding wall 2320 to fit in the through hole 2200, and a maximum outside diameter of the surrounding wall 2320 equals to a diameter of the bottom portion 2310. Therefore, when an accommodating base is inserted into the through hole 2200 along an axial direction 12 perpendicular to a central axis 11 from an outer wall of the socket 2000, the accommodating base is restricted by a tapered surface of the surrounding wall 2320, and thus the accommodating base is prevented from protruding into an operating space by an external impact to improve the strength of the accommodating base engaging with the through hole 2200. In the second embodiment, a shape of the supporting portion 2420 of the abutting element can be a cylinder and the supporting portion 2420 is inserted into a corresponding accommodating space of the accommodating base. In other embodiments, the shape of the supporting portion can correspond to a shape of the surrounding wall to be tapered off along the direction from the outer wall to the operating inner surface. When the supporting portion is stressed and deformed into the accommodating space, the slanted supporting portion is restricted to the accommodating space to avoid the fact that the abutting element is detached from the accommodating base while abutting against the tool, so as to improve the engaging strength between the supporting portion and the accommodating base, but the present disclosure is not limited thereto.

Figure 4:
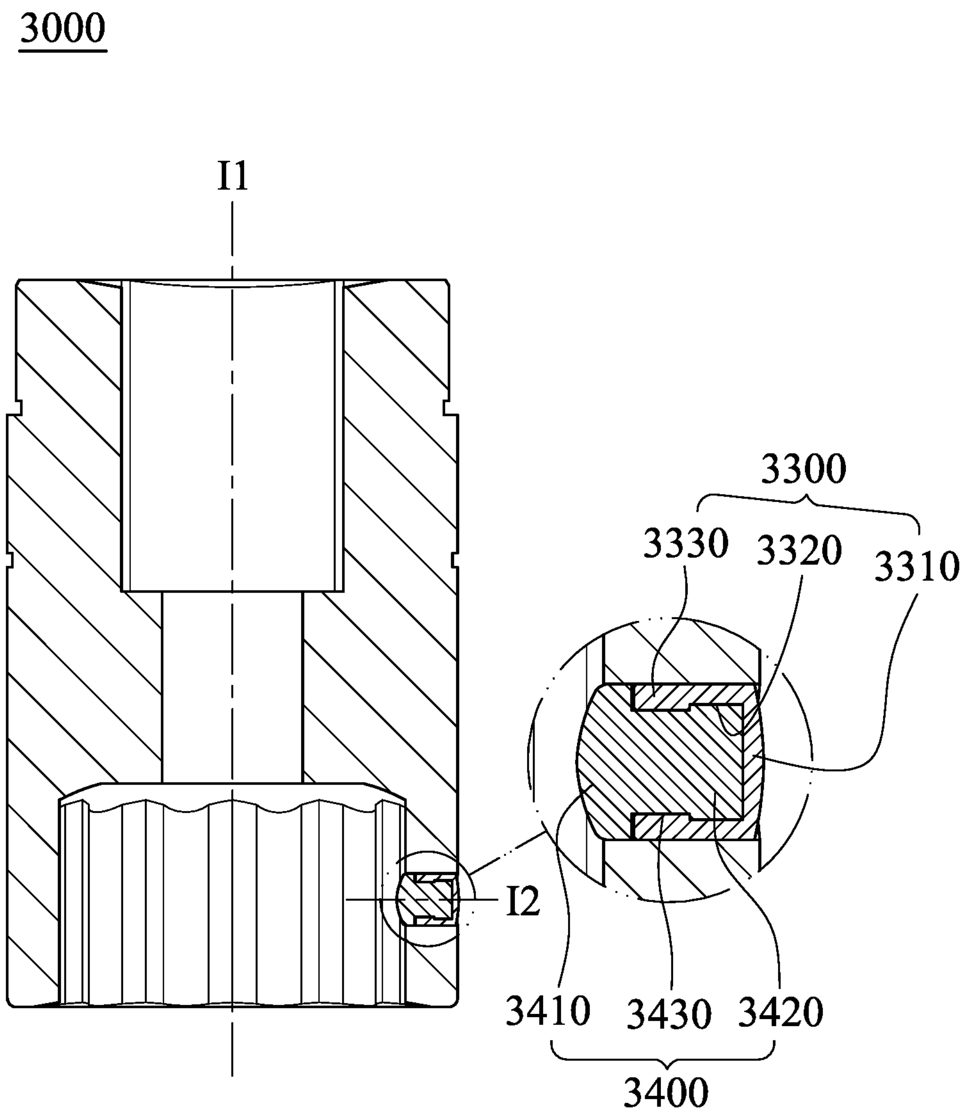
FIG. 4 shows a cross-sectional view of a socket according to the third embodiment of the present disclosure.

FIG. 4 shows a cross-sectional view of a socket 3000 according to the third embodiment of the present disclosure. In the third embodiment, a structure of the socket 3000 is similar with the structure of the socket 1000 of the first embodiment, so it will not be described herein again. It is worthy to be mentioned that an accommodating base 3300 can include an engaging ring 3330, and the engaging ring 3330 is located at an inner side of a surrounding wall 3320.

Specifically, the engaging ring 3330 protrudes at the inner side of the surrounding wall 3320. The engaging ring 3330 can be located at the inner side away from a bottom portion 3310 so that a diameter of an opening of an accommodating space surrounding by the surrounding wall 3320 and the bottom portion 3310 is smaller than an inside diameter of the surrounding wall 3320. Therefore, the engaging strength between an abutting element 3400 and the accommodating base 3300 can be further improved. The abutting element 3400 can include an engaging groove 3430, the engaging groove 3430 is recessed in a supporting portion 3420, and the engaging ring 3330 engages with the engaging groove 3430. By configuration of the engaging groove 3430, a width of a middle region of the abutting element 3400 (corresponding to the position of the engaging groove 3430) is more narrowed than a width of each of top and bottom regions of the abutting element 3400 (corresponding to the positions of the an abutting portion 3410 and the supporting portion 3420, respectively). Then, when the abutting element 3400 is inserted into the accommodating space of the accommodating base 3300 along an axial direction 12 perpendicular to a central axis 11, a bottom of the supporting portion 3420 is stressed to pass through the engaging ring 3330 and contact a bottom portion 3310, and then the supporting portion 3420 is restricted between the engaging ring 3330 and the bottom portion 3310. Therefore, the engaging strength between the abutting element 3400 and the accommodating base 3300 can be further improved. In other embodiments, the abutting element can exclude the engaging groove, and the supporting portion can be stressed to pass through the engaging ring and accommodated in the accommodating space by elasticity to simplify the design of the abutting element.

In summary, the present disclosure provides a socket which has the following advantages: first, by the configuration of the abutting element and the accommodating base, the difficulty of processing the socket and the manufacturing cost can be reduced; second, through the outside diameter of the surrounding wall being tapered off, the accommodating base can be prevented from protruding into the operating space; and, third, by disposing the engaging ring and the engaging groove, the engaging strength of the abutting element engaging with the accommodating base can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A socket, comprising:

a body, comprising:

an outer wall; and an operating inner surface surrounding an operating space, and the operating space configured for a tool to insert therein;

a through hole penetrating the outer wall and the operating inner surface radially, and the through hole communicated with the operating space;

an accommodating base accommodated in the through hole, and comprising:

a bottom portion located at an outer end of the through hole and covering the through hole; and a surrounding wall connected to the bottom portion and located in the through hole, wherein the surrounding wall and the bottom portion surround an accommodating space; and an abutting element disposed in the accommodating space, wherein the abutting element is partially exposed from the through hole and protrudes into the operating space, and the abutting element is configured for abutting against the tool;

wherein the abutting element comprises an abutting portion and a supporting portion, the abutting portion is integrally connected to the supporting portion, and the supporting portion is connected to the surrounding wall and the bottom portion.

2. The socket of claim 1, wherein the through hole penetrates the operating inner surface to form a first opening, the through hole penetrates the outer wall to form a second opening, and a diameter of the first opening is smaller than a diameter of the second opening.

3. The socket of claim 2, wherein an outside diameter of the surrounding wall is tapered off along a direction from the outer wall to the operating inner surface.

4. The socket of claim 1, wherein the accommodating base comprises an engaging ring, the engaging ring is located at an inner side of the surrounding wall, the abutting element comprises an engaging groove, and the engaging ring engages with the engaging groove.

5. The socket of claim 1, wherein the accommodating base is made of a metal material.

6. The socket of claim 1, wherein the surrounding wall is integrally connected to the bottom portion.

7. The socket of claim 1, wherein the abutting element is made of an elastic material.

8. The socket of claim 1, wherein an angle is included between an axial direction of the through hole and a central axis of the body.

9. The socket of claim 1, wherein a diameter of the through hole is 3 mm.

10. The socket of claim 1, wherein the supporting portion is accommodated in the accommodating space, and the abutting portion covers the surrounding wall.

11. A socket, comprising:

a body, comprising:

an outer wall; and an operating inner surface surrounding an operating space, and the operating space configured for a tool to insert therein;

a through hole penetrating the outer wall and the operating inner surface radially, and the through hole communicated with the operating space;

an accommodating base accommodated in the through hole, and comprising:

a bottom portion located at an outer end of the through hole and covering the through hole; and a surrounding wall connected to the bottom portion and located in the through hole, wherein the surrounding wall and the bottom portion surround an accommodating space; and an abutting element disposed in the accommodating space, wherein the abutting element is partially exposed from the through hole and protrudes into the operating space, and the abutting element is configured for abutting against the tool;

wherein the through hole penetrates the operating inner surface to form a first opening, the through hole penetrates the outer wall to form a second opening, and a diameter of the first opening is smaller than a diameter of the second opening.

12. The socket of claim 11, wherein an outside diameter of the surrounding wall is tapered off along a direction from the outer wall to the operating inner surface.

13. A socket, comprising:

a body, comprising:

an outer wall; and an operating inner surface surrounding an operating space, and the operating space configured for a tool to insert therein;

a through hole penetrating the outer wall and the operating inner surface radially, and the through hole communicated with the operating space;

an accommodating base accommodated in the through hole, and comprising:

a bottom portion located at an outer end of the through hole and covering the through hole; and a surrounding wall connected to the bottom portion and located in the through hole, wherein the surrounding wall and the bottom portion surround an accommodating space; and an abutting element disposed in the accommodating space, wherein the abutting element is partially exposed from the through hole and protrudes into the operating space, and the abutting element is configured for abutting against the tool;

wherein the accommodating base comprises an engaging ring, the engaging ring is located at an inner side of the surrounding wall, the abutting element comprises an engaging groove, and the engaging ring engages with the engaging groove.

* * * * *